United States Patent [19]

Van Kampen et al.

[11] Patent Number: 4,821,246

[45] Date of Patent: Apr. 11, 1989

[54] ELECTROMAGNETIC VIBRATOR FOR SEISMIC AND CIVIL-ENGINEERING APPLICATIONS

[75] Inventors: Willem A. Van Kampen, Voorschoten; Anne R. Ritsema, De Bilt; Rudolf Unger, Houten, all of Netherlands

[73] Assignee: Stichting Voor De Technische Wetenschappen, Utrecht, Netherlands

[21] Appl. No.: 48,223

[22] Filed: May 11, 1987

[30] Foreign Application Priority Data

May 12, 1986 [NL] Netherlands ............ 8601195

[51] Int. Cl.⁴ .............................................. H04R 23/00
[52] U.S. Cl. .................................... 367/189; 367/190; 181/113; 181/121
[58] Field of Search ............... 181/108, 113, 114, 121, 181/401; 367/189, 190; 310/15, 90.5; 73/576, 578, 668; 318/119, 122; 361/141, 143

[56] References Cited

U.S. PATENT DOCUMENTS

| | | | |
|---|---|---|---|
| 3,287,696 | 11/1966 | Cholet et al. | 181/121 |
| 3,302,744 | 2/1967 | Lemm | 181/0.5 |
| 3,313,370 | 4/1967 | Cole | 367/189 |
| 4,222,455 | 9/1980 | Lerwill | 181/121 |
| 4,371,800 | 2/1983 | Brander | 310/15 |
| 4,529,898 | 7/1985 | Voloshin et al. | 367/189 |
| 4,623,202 | 11/1986 | Shingu | 310/90.5 |
| 4,631,430 | 12/1986 | Aubrecht | 318/122 |
| 4,644,205 | 2/1987 | Sudo et al. | 310/90.5 |
| 4,715,470 | 12/1987 | Paulsson | 181/106 |

FOREIGN PATENT DOCUMENTS 0978946 12/1982 U.S.S.R. .
1106551 8/1984 U.S.S.R. .

Primary Examiner—Deborah L. Kyle
Assistant Examiner—John W. Eldred
Attorney, Agent, or Firm—Rosen, Dainow & Jacobs

[57] ABSTRACT

An electromagnetic vibrator for seismic and civil-engineering applications is provided with a supporting structure fitted with a coupling element, and a reaction mass, which is to be caused to vibrate, with an electromagnetic drive associated therewith and provided at least with electromagnetic coils. The reaction mass is magnetically suspended on the supporting structure by means of one or more magnets with the associated electromagnetic coils and is at the same time caused to vibrate by the electromagnetic drive. The vibration force is exerted on the pole surface of the one or more magnets and the reaction mass is accelerated to at most the acceleration due to gravity.

14 Claims, 2 Drawing Sheets

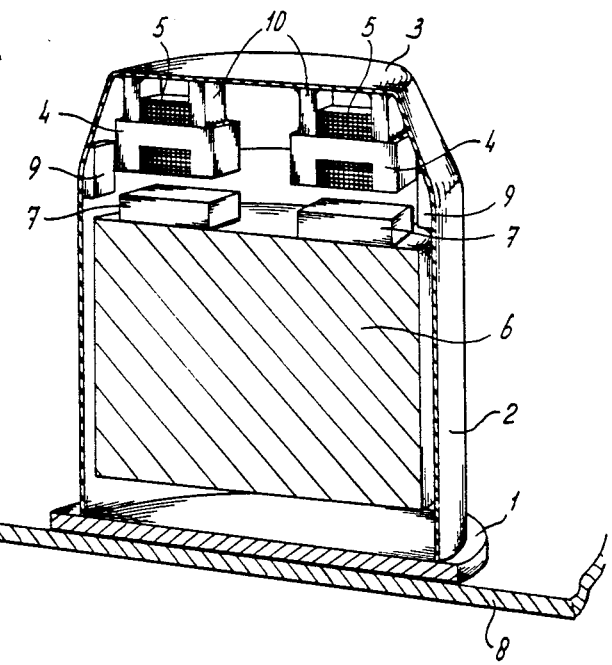
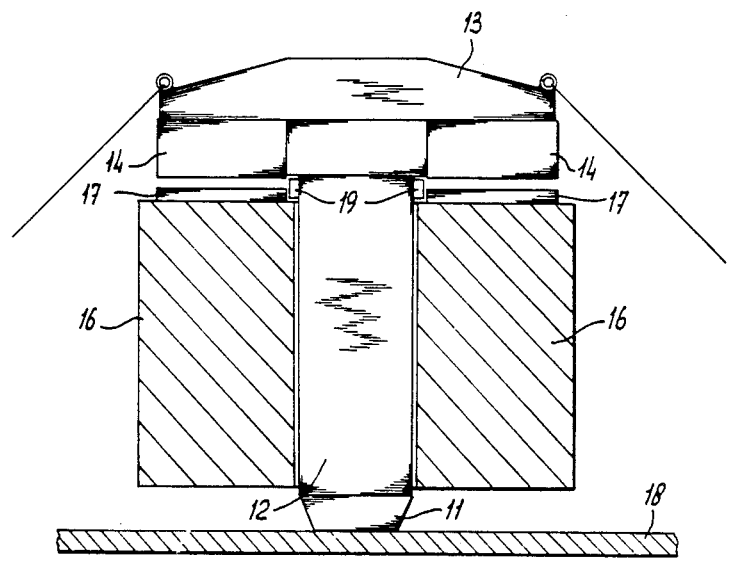

— ELECTRICAL CONNECTION

⇔ MAGNETIC FORCE

→ CONTROL SIGNAL

ELECTROMAGNETIC VIBRATOR FOR SEISMIC AND CIVIL-ENGINEERING APPLICATIONS

The invention relates to an electromagnetic vibrator for seismic and civil-engineering applications, which vibrator is provided with a supporting structure fitted with a coupling element, and a reaction mass, which is to be caused to vibrate, with an electromagnetic drive associated therewith and provided at least with electromagnetic coils. Such an electromagnetic vibrator is known from U.S. Pat. No. 3,313,370.

In the technology of seismic exploration it is known that use is made of vibration or oscillation generators based on various principles to transmit vibrations in the earth. According to one of these principles, a seismic vibrator, force variation functions can be brought about on the earth by accelerating a mass by means of a mechanical, hydraulic or electric drive. Thus, in the vibrator known from the abovementioned U.S. patent an acceleration of the reaction mass is brought about in an electromagnetic manner. In this electromagnetic system, the force is transmitted via the coils. At the considerable forces required for seismic exploration, in particular at low frequencies, mechanical defects may arise in the drive coils. To prevent this, a heavy construction which is difficult to implement is required. It is also necessary to neutralise the mechanical natural resonances of the reaction mass which is secured with springs or, if possible, to shift them to a frequency range in which the vibrator does not have to operate.

In order to prevent the contact with the surface of the earth being lost during the transmission of the force variation function generated by the vibration to the surface of the earth by means of the coupling element such as a pressure or base plate, use is generally made in seismic vibrators of an additional hold-down auxiliary mass which exerts an additional force on the base plate by means of a spring system. Said hold-down mass forms, together with the spring system, a mechanical filter which has natural resonances below 100 Hz in the frequency range of the exploration which is of interest.

In the practice of seismic exploration, vibrators of the hydraulic type are often used. With this type of vibrators resonance phenomena also occur. In addition, hydraulic vibrators exhibit a considerable harmonic distortion of the signal transmitted as a result of the specific hydraulic components such as servovalves and pumps and the like.

Furthermore, with a view to signal processing and signal identification, it is desirable that in addition to signals whose frequency varies slowly with time, signals of a different type can also be generated. In addition, it is desirable that the signal transmitted exhibits no deviation from the specified variation over a long time. At the same time, for seismic exploration in particular, a frequency range is of importance which extends from approx. 0.1 Hz to approx. 200 Hz. Thus, a signal which varies sinusoidally with time is outstandingly suitable for identification and correlation techniques, a rapid phase reversal occurring in a pseudostochastically specified manner.

The object of the invention is therefore to provide an electromagnetic vibrator which can generate a highly defined and distortion-free vibration signal belonging to the category of frequency- and amplitude-modulated signals, over a wide range of frequencies of approx. 0.1–200 Hz without appreciable wear over long periods and without disturbing resonances. The object of the invention is also to avoid the use of a hold-down auxiliary mass with a spring system.

In an electromagnetic vibrator of the type mentioned in the introduction this is achieved according to the invention in that the reaction mass is magnetically suspended on the supporting structure by means of one or more magnets with the associated electromagnetic coils and is at the same time caused to vibrate by the electromagnetic drive, the vibration force being exerted on the pole surface of the one or more magnets and the reaction mass being accelerated to at most the acceleration due to gravity.

An advantageous embodiment is characterized in that said one or more magnets contain permanent-magnet magnetic segments.

An advantageous further embodiment of the invention is characterized in that the armature and the yoke of the one or more magnets are disposed respectively in the reaction mass and in the supporting structure.

The vibration force brought about by the electromagnetic drive is transmitted directly to the pole surfaces of the magnets and transmitted via the latter and the supporting structure to the base plate. This is in contrast to the electrodynamic system from the said U.S. patent in which the force is transmitted via the coils.

Very large weights can be lifted by this magnetic suspension or levitation, as a result of which it is possible to make the reaction mass of exceptionally heavy construction so that a high peak force can be obtained without the acceleration due to gravity being exceeded. In contrast to the vibrators generally used, it is not therefore necessary to use a separate hold-down auxiliary mass in this magnetic levitation vibrator.

With this magnetic suspension, the magnets can be regulated very rapidly and efficiently by power electronic means, as a result of which the movement of the reaction mass can be controlled in the frequency range concerned. At the same time, the reaction mass can undergo a vertical displacement which is approximately 8 cm at the lowest frequency and less than 1 mm at the highest frequency. A very coherent signal transmission and transmission of rapidly varying signals such as linearly and non-linearly frequency-modulated signals and signals modulated according to a pseudo-random series become possible as a result of the electronic control system.

For the purpose of an optimum electrical impedance matching it is possible with advantage to match the number of windings of the coils to the frequency range used without mechanical modifications having to be introduced.

In addition to the fact that the abovementioned electromagnetic vibrator can be used for seismic exploration, it can also be used with great advantage for civil-engineering applications such as for roadway coverings, dike cores, constructional works and also for ship sides, reactor vessels, material investigation in general, and the like. Application as a tool is also possible in the compacting of soil, pile-driving operations, and the like.

Seismic exploration comprises in particular the following applications:

(a) propagation over a large distance at low frequencies (earthquake and earth structure investigation): approx. 0.1–10 Hz, continuous series of measurements lasting a few days to several weeks being desirable, (b) seismic exploration of deep earth structure in the middle frequency range: approx. 5–35 Hz, (c) seismic exploration for the purpose of exploring hydrocarbons: approx. 10–200 Hz, measurement series of tens of seconds being desirable.

The abovementioned vibrator can be constructed for the whole frequency range of 0.1–200 Hz and over, in one device, since the basic dimensions of the reaction mass and the magnet(s) are independent of frequency provided the peak force of the vibrator is not altered.

Because the principle of magnetic suspension is used in the vibrator according to the invention and because an appropriate form is given to the magnetic field, essentially vertical forces are generated. It is possible, however, to operate the vibrator with an inclination with respect to the vertical provided sufficient provisions are made to absorb the lateral forces which then occur. The stability of the magnetic suspension is achieved by determining the speed and position of the reaction mass by means of one or more inertia sensors sited on the reaction mass.

The movement of the reaction mass can be regulated by a digital control system. Said digital control system can be preprogrammed for the purpose of the force variation function to be generated. The control system will compare the programmed values of the force variation function and the associated system variables with the actual values which occur in the system and, if necessary, with the signals occurring outside the vibrator which are a consequence of the operation of the vibrator. The control system will be able to correct undesirable variations immediately and is able to correct the programmed function values on a larger timescale.

An important property of the vibrator is its phase reliability, i.e. the fact that the force signal generated by the vibrator is always accurately related to a known reference signal. In this vibrator a force and velocity measurement can be carried out in the base plate in order to avoid the uncertainty which would exist if the force and velocity had to be derived from indirect measurements such as reaction mass and base plate acceleration.

In addition to the phase, the amplitude of the vibration must be stable. This is mainly of importance in relation to the power transmitted and the reliability in relation to the reference signal. As a result of the magnetic suspension and the fast electronic control system coupled thereto which responds immediately, the harmonic distortion is reduced to very low values compared with the known hydraulic vibrators.

The invention will now be explained in more detail on the basis of some exemplary embodiments, with reference to the drawings, in which:

FIG. 1 shows a sectional view of a cylindrical construction of the vibrator according to the invention;

FIG. 2 shows a sectional view of a columnar construction of the vibrator according to the invention.

FIG. 1 shows an embodiment of the vibrator according to the invention with a cylindrical construction of the supporting structure.

Figure 3:
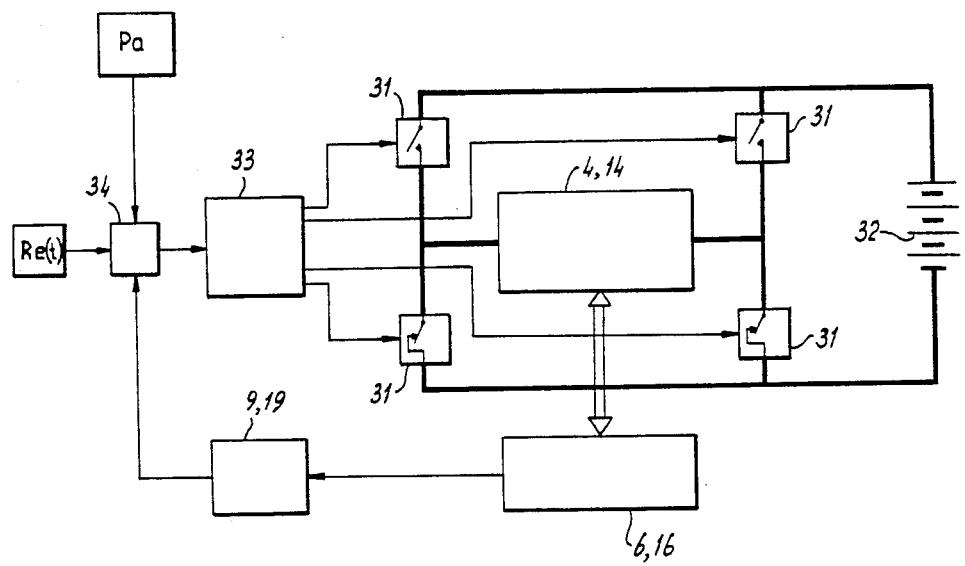
FIG. 3 shows a block diagram of the electronic control system for the vibrator in FIGS. 1 and 2.

The base or coupling plate 1, which forms the lowermost part of a cylindrical supporting structure or housing 2, rests on the surface of the earth 8. At the top of the supporting structure 2 there is provided a top plate 3 to which one or more lifting magnets 4 provided with coils 5 are attached by means of fixing elements 10. Inside the supporting structure 2, beneath the lifting magnets, there is a large reaction mass 6 which also functions as a hold-down auxiliary mass and in which the armatures 7 of the lifting magnets are incorporated at the top. It is obvious that the yoke and coil in the lifting magnet 4 and the armature 7 in the reaction mass 6 shown in this figure can be provided in mutually interchanged positions.

In FIG. 2 another embodiment of the vibrator according to the invention is shown which has a columnar construction of the supporting structure.

The base or coupling plate 11, which again forms the lowermost part of a columnar supporting structure 12, rests on the surface of the earth 18. At the top of said column there is provided a top plate 13 which carries one or more electromagnets 14 which are provided with coils. Around the supporting structure 12 there is the reaction mass 16 which is provided with the armature 17 at the top around the columnar supporting structure 12. The reaction mass 16 is suspended on the lifting magnets 14 and can move freely along the column. The supporting structure 2 or the column 12 incorporates electrical sensors 9, 19 which detect the movement in the longitudinal direction of the reaction mass 6, 16.

Said reaction mass can amount to 10,000 kg, for example, for seismic applications. In this connection, the vibrator has a constant peak force of approx. 50 kN for the frequency range of approx. 0.1–200 Hz mentioned and a constant peak force of approx. 100 kN for a somewhat smaller frequency range of approx. 2–100 Hz. For civil-engineering applications, the reaction mass can be considerably greater.

FIG. 3 shows a block diagram of a possible embodiment of the electronic control system of the electromagnetic drive of the vibrator. The electromagnet 4, 14 is either connected or not connected by means of the power-electronic switches 31 to the electrical power source 32 depending on the control signals which the regulating unit 33 transmits to the switches 31. The electromagnet 4, 14 sets the mass 6, 16 in motion by means of the magnetic force between yoke and armature of the electromagnet. The movement is detected by the sensor 9, 19 and compared in the comparator 34 with the time-dependent reference signal Re and with other variables Pa related to the vibration. In this respect, inertia sensors 9, 19 for example can be disposed on the reaction mass 6, 16. From the comparison, the regulating unit 33 determines which switches 31 should be open or closed.

Such a control system can be used to energize the electromagnets 4, 14 as a function of the electrical signal from the sensors 9, 19 and of a time-dependent reference signal Re. If a constant current is passed through the electromagnets 4, 14, the reaction mass will be pulled up as far as possible to the electromagnets or drop. However, the control system is constructed so that the reaction mass takes up a position in the vertical or longitudinal direction which is determined by the signals originating from the sensor 9, 19 and the reference signal Re. With such a control it is possible to suspend a reaction mass magnetically without there being any mechanical contact left with the environment.

Causing the signal Re to vary with time results in a variation in the position of the reaction mass in the vertical direction. The reaction force, experienced in the electromagnets as a result of the acceleration of the reaction mass which occurs, is transmitted via the supporting structure to the base plate and then to the surface of the earth.

It is obvious that changes and modifications can be made without leaving the scope of the invention. Thus, the cylindrical supporting structure or housing 2 shown in FIG. 1 may be a watertight construction for the purpose of underwater applications, the electronic power and regulating unit and the sensors shown in FIG. 3 being provided inside the housing.

We claim:

1. Electromagnetic vibrator for seismic and civil engineering applications to transmit vibrations to the earth, which vibrator is provided with a supporting structure connected to a coupling element which transmits said vibrations to the earth, and a reaction mass, which is to be caused to vibrate, with an associated electromagnetic drive and provided at least with electromagnetic coils, characterized in that the reaction mass is magnetically suspended on the supporting structure by means of one or more magnets having pole surfaces and the associated electromagnetic coils and is at the same time caused to vibrate by the electromagnetic drive, the vibration force being exerted on the pole surface of the one or more magnets and the reaction mass being accelerated to at most the acceleration due to gravity.

2. Electromagnetic vibrator according to claim 1, characterized in that the said one or more magnets contain permanent-magnet magnetic segments.

3. Electromagnetic vibrator according to claim 1 or 2,
   wherein said magnets form a yoke upon which said electromagnetic coils are wrapped around, characterized in that the armature and yoke of the one or more magnets are disposed respectively in the reaction mass and in the supporting structure.

4. Electromagnetic vibrator according to claim 1, characterized in that electric sensors are provided in order to control the movement of the reaction mass in a manner such that a desired force variation function is generated; and in that the signals from the electric sensors are used in combination with time-dependent reference signals for the regulation of the electromagnetic drive.

5. Electromagnetic vibrator according to claim 1, characterized in that the stability of the magnetic suspension is achieved by determining the velocity and the position of the reaction mass by means of one or more inertia sensors sited on the reaction mass.

6. Electromagnetic vibrator according to claim 1, characterized in that a form is given to the magnetic field of the electromagnetic drive such that substantially a vertical vibration is performed.

7. Electromagnetic vibrator according to claim 1, characterized in that the supporting structure comprises a cylindrical housing in which the reaction mass, constructed in a disc shape, is suspended magnetically.

8. Electromagnetic vibrator according to claim 7 provided with an electronic power and regulating unit, characterized in that the said housing is of watertight construction for the purpose of underwater applications, the said electronic power and regulating unit and also the said sensors at the same time being provided inside the housing.

9. Electromagnetic vibrator according to claim 1, characterized in that the supporting structure comprises a central column with a projecting carrier element under which the reaction mass, constructed around the column, is suspended magnetically.

10. Electromagnetic vibrator according to claim 1, characterized in that, for seismic applications, the vibration force has a peak value of approximately 50 kN with a frequency range of approx. 0.1–200 Hz, the reaction mass amounting to approximately 10,000 kg.

11. Electromagnetic vibrator according to claim 1, characterized in that, for seismic applications, the vibration force has a peak value of approximately 100 kN with a frequency range of approx. 2–100 Hz, the reaction mass amounting to approximately 10,000 kg.

12. Electromagnetic vibrator according to claim 1, characterized in that a wide class of signal types, including linearly and non-linearly frequency-modulated signals and pseudo-stochastically modulated signals are generated.

13. Electromagnetic vibrator according to claim 1, characterized by the vibration force being directly exerted on the pole surface of said magnets.

14. Electromagnetic vibrator for seismic and civil engineering applications to transmit vibrations to the earth, which vibrator is provided with a supporting structure fitted with a coupling element which transmit said vibrations to the earth, and a reaction mass, which is to be caused to vibrate, with an associated electromagnetic drive and provided at least with electromagnetic coils, characterized in that the reaction mass is magnetically suspended with stability in three dimensions on the supporting structure by means of one or more magnets having pole surfaces and the associated electromagnetic coils and is at the same time caused to vibrate by the electromagnetic drive, the vibration force being exerted on the pole surface of the one or more magnets and the reaction mass being accelerated to at most the acceleration due to gravity.

* * * * *